United States Patent [19]

Takahashi et al.

[11] Patent Number: 5,335,334
[45] Date of Patent: Aug. 2, 1994

[54] DATA PROCESSING APPARATUS HAVING A REAL MEMORY REGION WITH A CORRESPONDING FIXED MEMORY PROTECTION KEY VALUE AND METHOD FOR ALLOCATING MEMORIES THEREFOR

[75] Inventors: Kikuo Takahashi; Toyohiko Kagimasa; Toshiaki Mori, all of Hachioji, Japan

[73] Assignee: Hitachi, Ltd., Tokyo, Japan

[21] Appl. No.: 751,778

[22] Filed: Aug. 29, 1991

[30] Foreign Application Priority Data

Aug. 31, 1990 [JP] Japan .................. 2-228129

[51] Int. Cl.⁵ .............. G06F 12/06; G06F 12/14
[52] U.S. Cl. ........................ 395/425; 380/4; 364/DIG. 2; 364/947.5; 235/382; 235/431
[58] Field of Search ............. 364/200, 900 MS File; 395/425; 380/4 MS File; 235/382, 431 MS File

[56] References Cited

U.S. PATENT DOCUMENTS

| | | | |
|---|---|---|---|
| 4,589,064 | 5/1986 | Chiba et al. | 364/200 |
| 4,658,356 | 4/1987 | Shiozaki et al. | 364/200 |
| 4,849,927 | 7/1989 | Vos | 364/900 |
| 4,868,736 | 9/1989 | Walker | 364/200 |
| 4,954,982 | 9/1990 | Tateishi et al. | 364/900 |
| 5,163,096 | 11/1992 | Clark et al. | 380/4 |

FOREIGN PATENT DOCUMENTS 63-289659 11/1988 Japan.
64-017138 1/1989 Japan.

Primary Examiner—Joseph L. Dixon
Assistant Examiner—Behzad James Peikari
Attorney, Agent, or Firm—Antonelli, Terry, Stout & Kraus

[57] ABSTRACT

A region comprising a plurality of real pages in a part of a real storage unit is provided with a first key storage unit having a plurality of key storage entries each corresponding to one of the plurality of real pages, while a second region comprising a plurality of real pages in the second part of the real storage unit is provided with a second key storage unit having a single key storage entry. When a real address designated by an instruction to be executed belongs to the first region, an entry corresponding to this address is accessed by a storage protection control circuit. When this address belongs to the second region, the second key storage unit is accessed irrespective of the address. Further, a key within the accessed key information is compared with a key on a program status word (PSW) allocated to a program to determine whether the execution of the instruction is permitted.

18 Claims, 8 Drawing Sheets

FIG. 3

| KIND OF INSTRUCTION | | OUTPUT SIGNAL VALUE OF INSTRUCTION ANALYZE CIRCUIT 40 | | | |
|---|---|---|---|---|---|
| | | 41 | 42 | 43 | 44 |
| ACCESS TO KEY STORAGE | WRITE INTO KEY STORAGE | 1 | 0 | 0 | 0 |
| | READ FROM KEY STORAGE | 0 | 1 | 0 | 0 |
| ACCESS TO MAIN STORAGE | ACCESS FOR INFORMATION REFERENCE | 0 | 0 | 1 | 0 |
| | ACCESS FOR INFORMATION UPDATE | 0 | 0 | 0 | 1 |

FIG. 4

| COMPARISON RESULT | VALUE OF OUTPUT SIGNAL 311 OF REGION DETERMINATION CIRCUIT 310 |
|---|---|
| $IN_1 \leq IN_2$ | 1 |
| $IN_1 > IN_2$ | 0 |

FIG. 5

| COMPARISON RESULT | VALUE OF OUTPUT SIGNAL 312 OF KEY VALUE COMPARISON CIRCUIT 340 |
|---|---|
| COINCIDENCE | 1 |
| DISCREPANCY | 0 |

FIG. 7
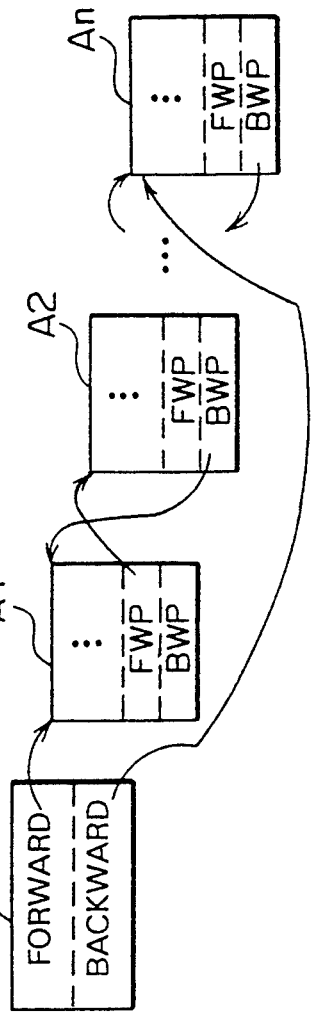
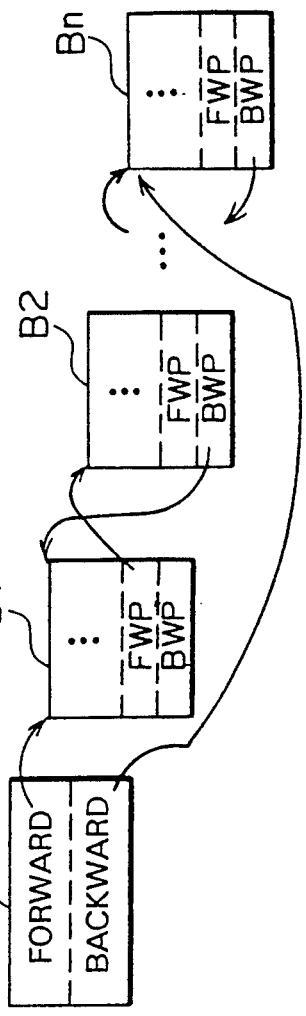

FIG. 8
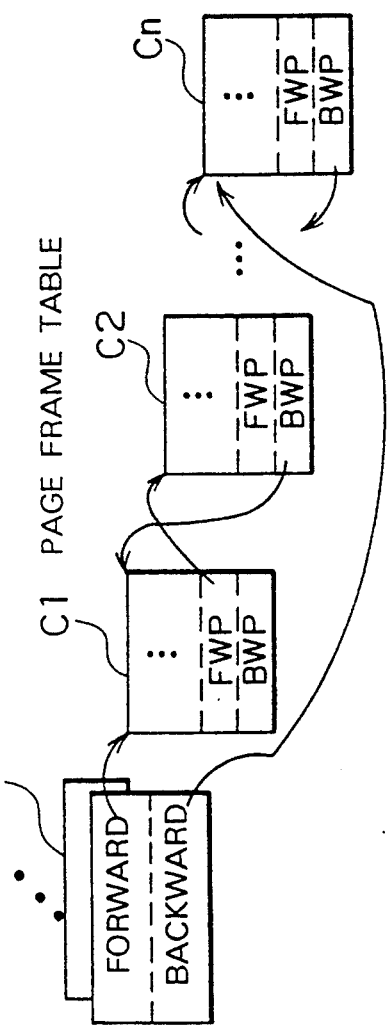
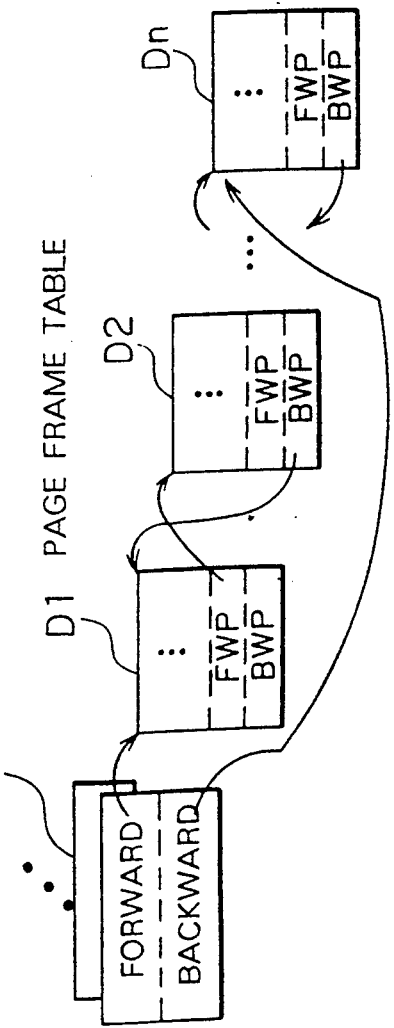

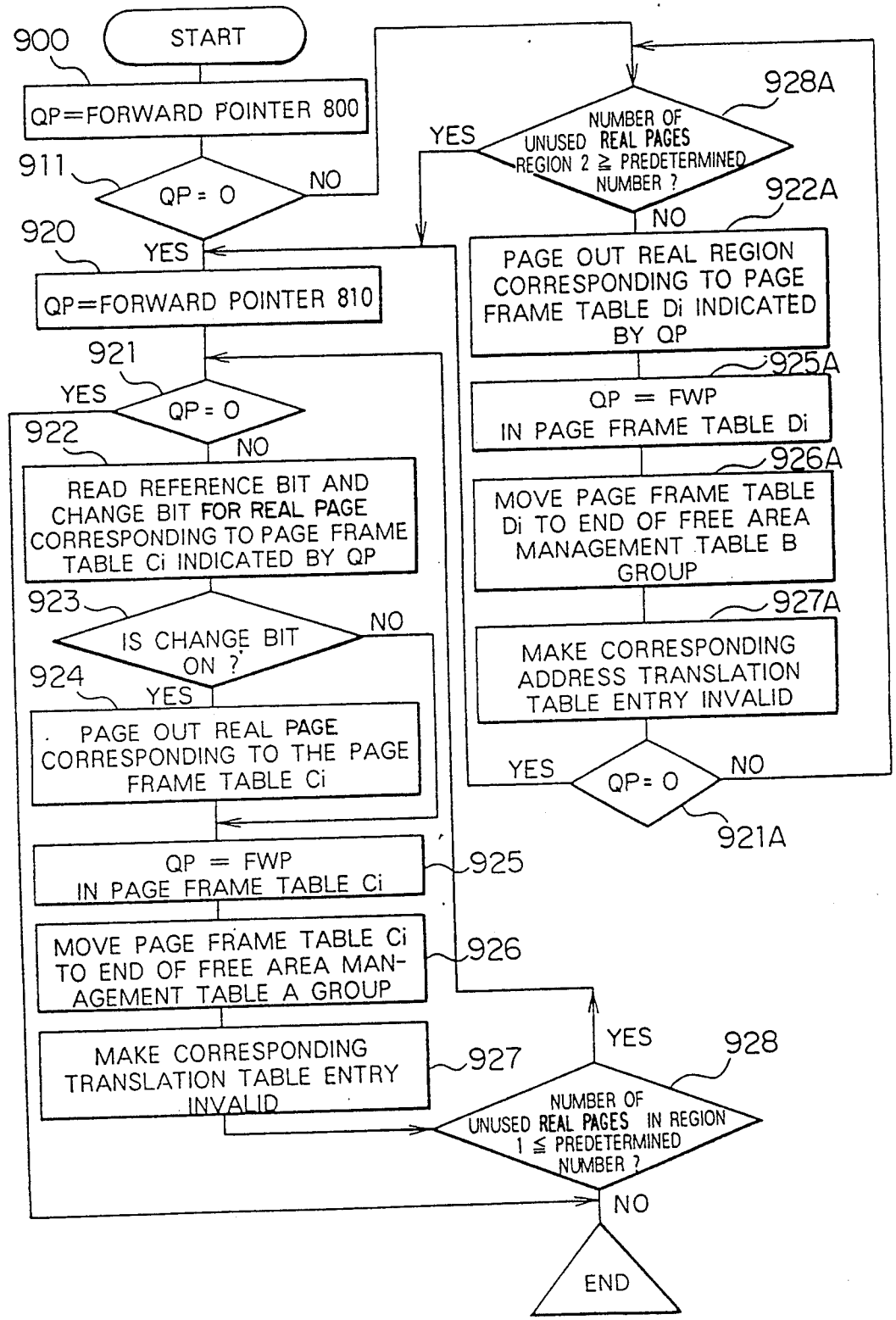
FIG. 9  6 FREE AREA GENERATION PROCESSING

FIG. 10

EXAMPLE OF FORMAT OF INSTRUCTION FOR ACCESS TO KEY STORAGE

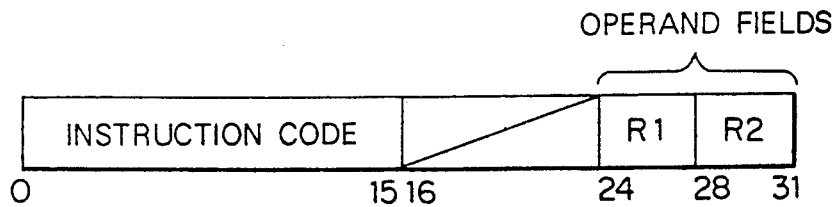

FIELD R1 : HOLDS INFORMATION TO BE WRITTEN INTO KEY STORAGE OR DESIGNATES A GENERAL REGISTER FOR STORING READ INFORMATION (NOT USED FOR RRBE INSTRUCTION).

FIELD R2 : DESINGATES A GENERAL REGISTER FOR HOLDING A REAL ADDRESS INDICATING AN ACCESS LOCATION IN THE KEY STORAGE.

FIG. 11

EXAMPLE OF FORMAT OF INSTRUCTION FOR ACCESS TO MAIN STORAGE

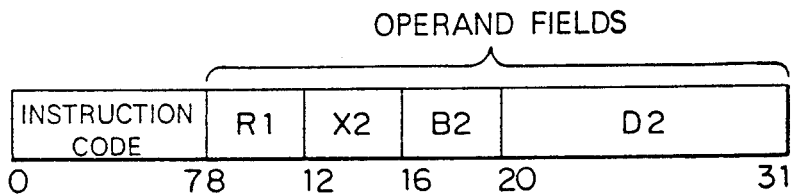

FIELD R1 : HOLDS INFORMATION TO BE WRITTEN INTO THE MAIN STORAGE OR DESIGNATES A GENERAL REGISTER FOR STORING READ INFORMATION.

FIELD X2 : DESIGNATES A GENERAL REGISTER FOR HOLDING A PART OF VIRTUAL ADDRESS INDICATING AN ACCESS LOCATION IN THE MAIN STORAGE.

FIELD B2 : DESIGNATES A GENERAL REGISTER FOR HOLDING A PART OF VIRTUAL ADDRESS INDICATING AN ACCESS LOCATION IN THE MAIN STORAGE.

FIELE D2 : INDICATES A DISPLACEMENT FROM A LOCATION OBTAINED BY THE FIELDS X2、B2.

DATA PROCESSING APPARATUS HAVING A REAL MEMORY REGION WITH A CORRESPONDING FIXED MEMORY PROTECTION KEY VALUE AND METHOD FOR ALLOCATING MEMORIES THEREFOR

BACKGROUND OF THE INVENTION

This invention relates to a configuration for a real storage in a computer system, and more particularly to a method for allocating memories and a data processing apparatus therefor suitable for realizing a large capacity real storage unit.

In a conventional virtual storage type computer system, a real storage is divided into management units (real pages), each having the same size as a virtual page, and each of the management units is provided with a key storage entry for storage protection. The key storage entry for each management unit provides no problems for a real storage capacity which is in the order of several hundred megabytes (MB). However, a large capacity of real storage, for example, approximately 50 gigabytes (GB) requires a significant number of key storage entries, whereby the capacity of the whole key storage unit must be taken into account. Specifically, the key storage unit is referenced or updated each time a region on the real storage unit is accessed, therefore high speed access is required. For this reason, the key storage unit is generally composed of expensive high speed semiconductor devices, whereby an enormous increase in the capacity of the key storage unit will increase the cost of the whole system. As a more significant problem, the key storage unit, if the capacity thereof is excessively increased, cannot be packaged in a predetermined space of the system, which results in a longer access time of the key storage and, consequently, deterioration of the performance of the whole system. To cope with this problem, JP-A-63-289659 (the corresponding U.S. application thereof has been issued as U.S. Pat. No. 4,991,082 on Feb. 5, 1991) and JP-A-64-17138 discuss methods of setting a larger management unit for a real storage unit, by which the number of installed key storage entries is determined, to thereby reduce the number of key storage entries (the capacity of the key storage unit).

However, even with the management unit enlarged as disclosed in the above-mentioned prior art, if a larger number of storage units becomes necessary, the number of the key storage entries will have to be correspondingly increased.

SUMMARY OF THE INVENTION

It is an object of the invention to provide a large capacity real storage unit without increasing the capacity of a key storage unit.

To achieve the above object, the present invention provides a data processing apparatus comprising: key hold means having a plurality of storage locations, each storage location corresponding to each of a plurality of real unit regions belonging to a first region constituting a part of the real storage unit and a single storage location provided commonly for a plurality of real unit regions belonging to a second region of the real storage unit, each of the plurality of storage locations, when a corresponding real unit region is allocated to a virtual unit region, being loaded with a storage protection key determined by the virtual unit region, the single storage location, prior to allocating one of the plurality of real unit regions belonging to the second region to a virtual unit region, having been loaded with a single storage protection key predetermined for the second region; and means for determining whether or not access to said storage locations is permitted on the basis of a storage protection key stored in a storage location corresponding to the real unit region in the key storage means when a program under execution generates an access request to one of the real unit regions and when the real unit region belongs to the first region, and for determining whether or not access to said storage locations is permitted on the basis of the stored predetermined particular storage protection key when the real unit region required to be accessed belongs to the second region.

BRIEF DESCRIPTION OF THE DRAWINGS

FIG. 3 is a table for explaining output signals generated by a decoder shown in FIGS. 1 and 2;

FIG. 4 is a table for explaining output signals generated by a region determination circuit shown in FIGS. 1 and 2;

FIG. 5 is a table for explaining output signals generated by a key comparison circuit shown in FIGS. 1 and 2;

FIG. 7 is a diagram showing table groups for managing unused areas in a real storage;

FIG. 8 is a diagram showing table groups for managing used areas in the real storage;

FIG. 9 illustrates a processing flow for generating an unused free region when the real storage is insufficient;

FIG. 10 is a diagram showing a format of an instruction for access to a key storage; and FIG. 11 is a diagram showing a format of an instruction for access to a main storage.

DESCRIPTION OF THE PREFERRED EMBODIMENT

Figure 1:
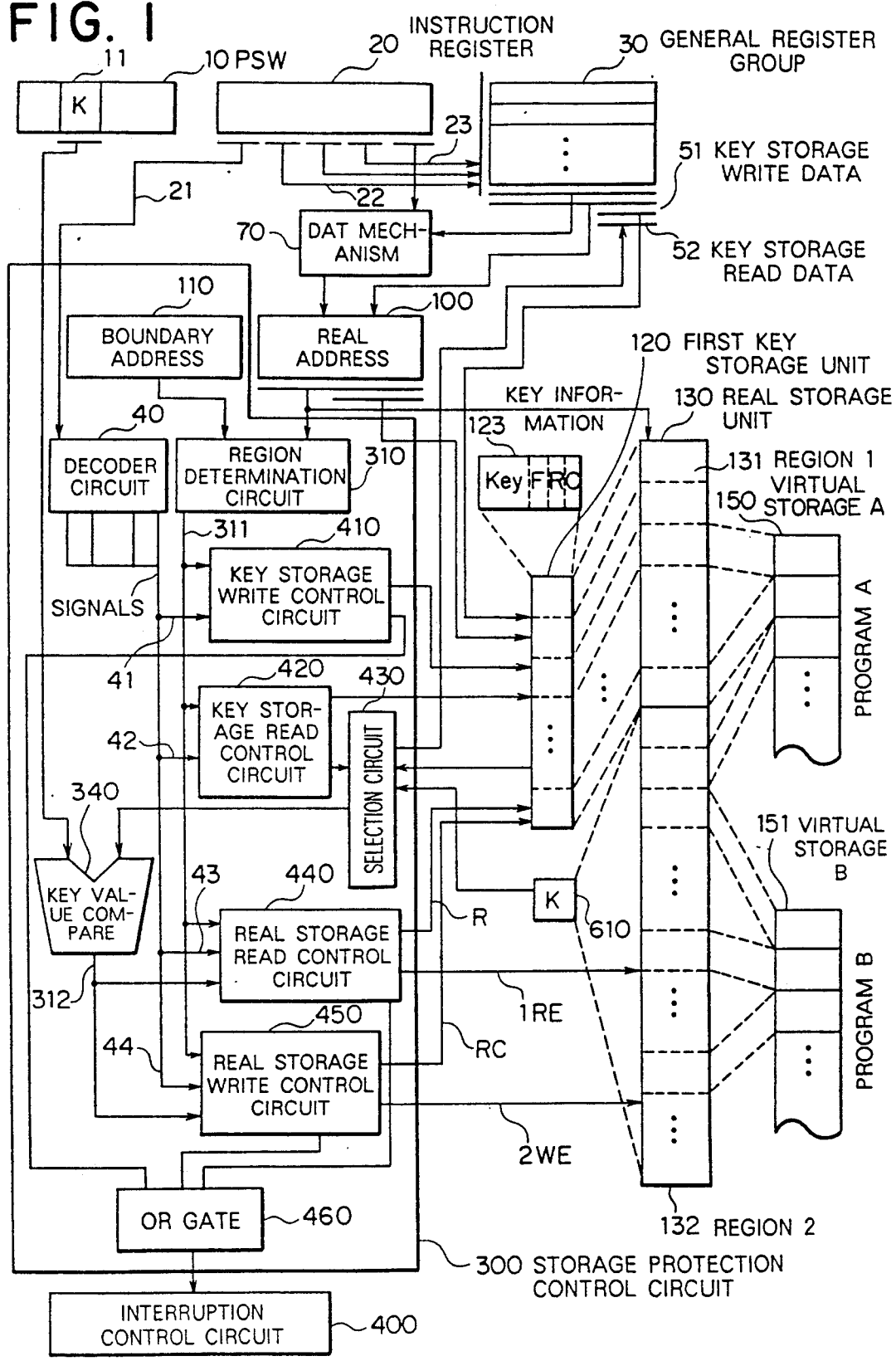
FIG. 1 is a circuit block diagram showing a computer system.

An embodiment of the present invention will hereinbelow be described with reference to the accompanying drawings. FIG. 1 illustrates a concept of a computer system of the present embodiment. In the following explanation, a real storage allocating processing executed by the operating system (hereinbelow simply called the "OS") will be described, and thereafter description on the operation of the hardware shown in FIG. 1 will follow. Prior to describing the real storage allocation processing of the OS, associated parts in the computer system shown in FIG. 1 will be briefly described. Parts indicated by thick lines in FIG. 1 constitute the characterizing part of the invention. Within these parts, a first key storage unit 120, a second key storage unit 610 and a real storage unit 130 will be described. The real storage unit 130 is composed of a region 1 131 and a region 2 132 which are both divided into management units, each unit occupying a 4 KB area which is equal to the size of a virtual page of a virtual storage A 150 and a virtual storage B 151. The first key storage unit 120 is provided for the real storage region 1 131 and comprises entries each corresponding to each of the divided 4-KB management units (hereinbelow called the "real storage management unit"). On the other hand, the second key storage unit 610 is provided for the real storage region 2 132, where an entry is set for the whole storage region 2 132. In this embodiment, the second key storage unit 610 is set to a predetermined particular key value "8", as will be later described in detail. This particular key value may be set by any method: for example, the OS may set the value by using a specially provided instruction when an IPL (Initial Program Load) is executed.

Next, the real storage allocation processing in this embodiment will be described with reference to FIG. 6. It is assumed in this embodiment that the second key storage unit 610 provided for the real storage region 2 132 is set to the above-mentioned particular key value "8", and that a virtual page having the same key value only is selected and allocated to the real storage region 2 132, while the virtual page with the key number "8", in case the real storage region 2 132 is full, and virtual pages with a key value other than "8" are allocated to the real storage region 1 131. Next, the reason why the key value has been determined to be "8" will be explained giving an example of MVS (Multiple Virtual Storage) of IBM which can be regarded as a typical operating system for large-sized computers. In the MVS, storage protection key values are defined as follows:

(1) Storage Protection Key Value=0
is a key value assigned to a region used by an MVS system control program;

(2) Storage Protection Key Value=1
is a key value assigned to a region used by a job scheduler and a subsystem control program referred to as JES;

(3) Storage Protection Key Value=5
is a key value assigned to a region used by a data management program;

(4) Storage Protection Key Value=6
is a key value used by programs such as TCAM and VTAM;

(5) Storage Protection Key Value=8
is a key value assigned to a region used by a user program which needs address translation (V=V); and (6) Storage Protection Key Values=9-15
are key values assigned to a user program which does not execute address translation (V=R).

In this embodiment, the key value for the real storage region 2 132 is determined to be "8" which is a key value assigned to a normal user program region which is likely to consume the largest quantity of real storage of the above-mentioned regions. Since the region for normal user programs requires the largest quantity of region, this region is allocated in the real storage region 2 132 so as to suppress an increase in the key storage capacity due to expansion of the real storage.

Figure 6:
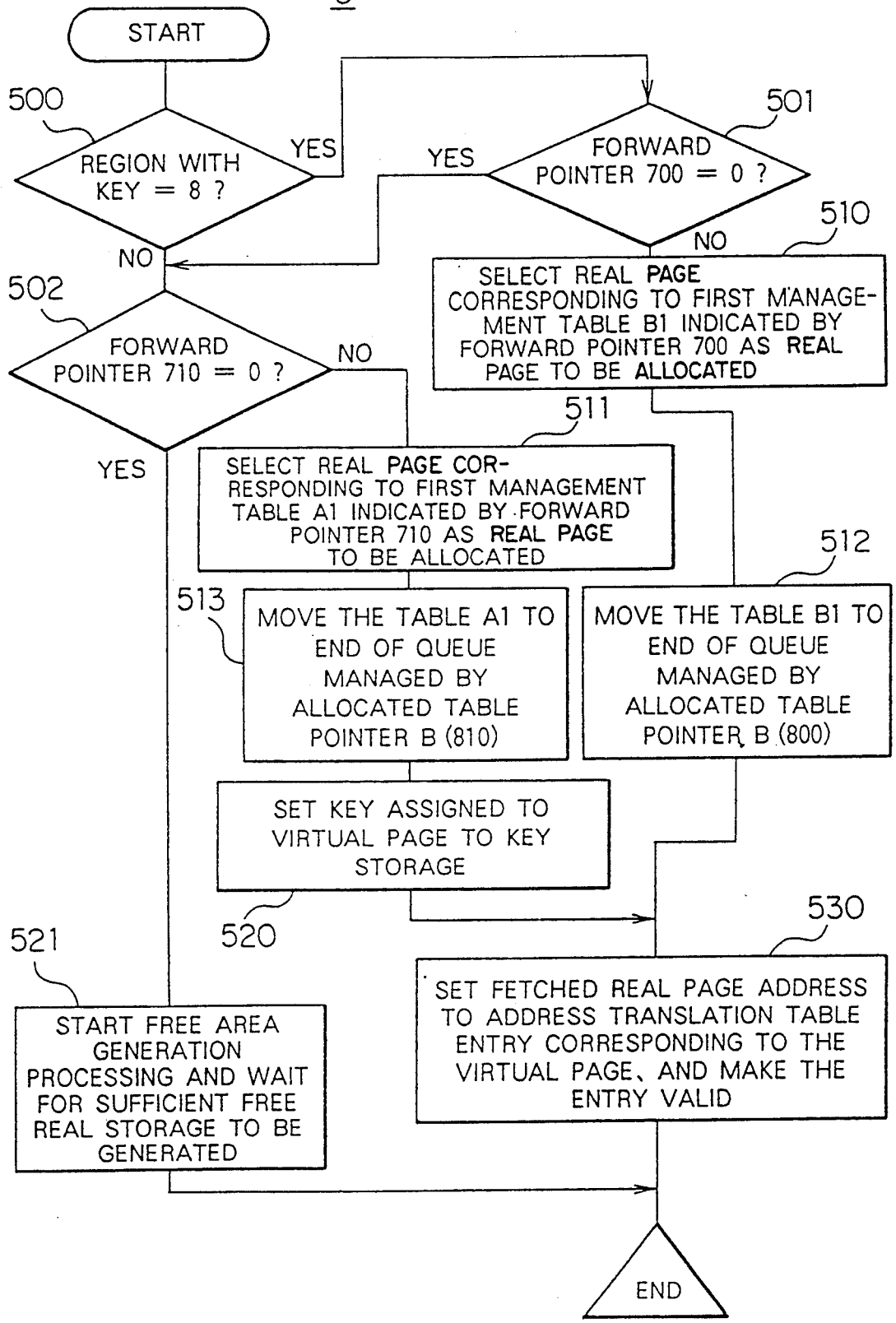
FIG. 6 is a flowchart showing a real storage allocation processing.

The page allocation processing shown in FIG. 6 is started in a manner similar to an ordinary demand paging type operating system. More specifically, when a virtual page in a virtual storage has been accessed and if a real page has not been allocated thereto, the page allocation processing is started by an address translation exception (page fault) notice from the system hardware. The processing of FIG. 6 describes, hereinbelow, as an example, a case where a real page is initially allocated to the accessed virtual page. In FIG. 6, operations newly provided for this embodiment are those executed at steps 500, 501, 510 and 512. The rest of the steps are substantially identical to those described in the previously cited U.S. Ser. No. 07/551,416. Further, a virtual storage type computer is generally provided with an address translation table (not shown) for translating a data location (virtual address) on the virtual region to a location (real address) on the real storage on which the data is actually recorded. Also, in the demand paging, an external page table (not shown), which is one of constituents of the address translation table (not shown) corresponding to the virtual address, holds a storage protection key value which is to be assigned to an associated virtual page. In other words, when a virtual storage region is reserved, a key value identical to a key (K) value 11 in FIG. 1 on a program status word (PSW) 10 in FIG. 1 of a program under execution is set to a corresponding entry on the external page table (not shown) for reserving the virtual storage region, unless a particular designation is made.

When the processing of FIG. 6 is started due to the occurrence of a page fault, the value set to the storage protection key is detected and is assigned to the virtual page including a virtual address at which the page fault has occurred at step 500 newly provided for this embodiment. More specifically, the storage protection key value corresponding to the virtual address at which the page fault has occurred is fetched from the foregoing external page table (not shown) and compared with the predetermined value "8". In this comparison, if the storage protection key value presents "8", an unused real management unit (which refers to the divided region having 4 KB described above and will be called the "real page" in the following explanation) is fetched from the real storage region 2 132 and is allocated to the virtual page in which the page fault has occurred. Before the details of this processing are described, explanation will be first given of a case where the storage protection key has a value other than "8". In this case, it is confirmed at step 502 whether or not unused real pages (real pages which have not been allocated to any of virtual pages) exist. This processing will be described with reference to FIG. 7. FIG. 7 shows a free area management table provided in the OS for managing use of the real storage. The structure of the table and a management method employed in this embodiment are the same as those of the previously cited U.S. Ser. No. 07/551,416, so that a simple description will merely be given to this processing. A group of respective unused real pages belonging to the real storage region 1 131 of the real storage 130 is collected, and a group of page frame tables A1, A2, . . . , An corresponding to the respective unused real pages is mutually coupled by pointers FWP and BWP in the respective page frame tables to be managed as a queue. In FIG. 7, a table pointer A 710 includes a group of pointers for indicating the beginning and the end of this queue. Similarly, a group of page frame tables B1, B2, . . . , Bn for managing an unused real page group belonging to the real storage region 2 (132) is connected to a table pointer B 700 to be managed as a queue.

Turning back to FIG. 6, at the foregoing step 502, if a forward pointer on the table pointer A 710 is zero, it is determined that there is no unused real page in the real storage region 1 131. When no unused real page is found on the real storage region 1, the processing proceeds to step 521 where a free area generation processing 6 is started as shown in FIG. 9, later described in detail. In this processing 6, several unused real pages are reserved in both of the real storage regions 1, 2, as will be later described. It should be noted that a key value other than "8" is allocated in the processing 6. Until an unused real page has been reserved in real storage region 1, the allocation of a real page to the accessed virtual page is suspended. The real storage allocation processing 3 shown in FIG. 6 is not started until the reservation of an unused real page has been completed in the real storage region 1. As a result, an unused real page in the real storage region 1, in which the reservation of an unused real page has been made, is allocated. If it is determined at step 502 that unused real pages exist in the real storage region 1, a real page is fetched from the real storage region 1 131 to be allocated to the virtual page at step 511. The fetching of this real page is carried out in the following manner. The first page frame table A1 coupled to the table pointer A 710 is fetched from a series of the page frame tables, a real page corresponding to the page frame table A1 is selected as a real storage region to be allocated to the virtual page, and the page frame table A1 is moved to the end of a queue 810 for managing allocated real storage regions at step 513. This allocated real storage management queue 810, as shown in FIG. 8, has a structure similar to that of the free area management table, thus explanation thereof will be omitted. Incidentally, the difference in management between both tables lies in that each one of the free area management table queues 700, 710 shown in FIG. 7 is provided for the whole system, whereas the allocated region management tables 800, 810 shown in FIG. 8 are provided corresponding to a virtual storage space to which a program being executed belongs.

Next, turning back to FIG. 6, at step 520, a key value assigned to the virtual page is set in an entry of the first key storage unit 120 corresponding to the real page selected at step 511. The setting of this key value is carried out by issuing an SSKE (SET STORAGE KEY EXTEND) instruction with the address of the selected real page and the key value assigned to the virtual page used as operands. The operation of the apparatus shown in FIG. 1, when setting the key value, will be later described. Next, at step 530, the address of the real page is set in an entry of the address translation table (not shown) corresponding to the virtual page, and this entry is made valid, thereby completing the page allocation processing for allocating the selected real page to the virtual page in which a page fault has occurred.

Next, reference is made to a case where the determination at step 500 indicates that the storage protection key value is "8". In this event, if there is an unused real page in the real storage region 2 132, it is allocated to the virtual page. Otherwise, a table pointer B 700 is checked at step 501, similar to the aforementioned step 502 for checking the existence of unused real pages in the real storage region 1 131, to confirm whether unused real pages exist in the real storage region 2 132. If it is confirmed that no unused real page exists in the real storage region 2, the processing jumps to step 502 to execute the above described processing (steps 502, 521, 511, 513, 520 and 530) for the case where the storage protection key value is not "8". Contrarily, if an unused real page is found in the real storage 1 131, this real page is allocated. If no unused real page exists in the real storage regions, an unused real page in the real storage region 1 or 2 is allocated after executing the free area generation processing 6 (see FIG. 9). If it is determined at step 501 that unused real pages exist in the real storage region 2, a real page to be allocated is selected, at steps 510 and 512, from the real storage region 2 based on the queue connected to the table pointer B 700, in a manner similar to the steps 511 and 513. Next, since the thus fetched real page has the key value previously set to "8" as mentioned above, the setting of key information, which has been executed at the step 520, is skipped, and the step 530 is instead executed to complete the page allocation processing.

By thus carrying out the allocation, the key storage protection identical to the prior art is executable for the virtual page to which a real page in the real storage region 1 131 has been allocated. A virtual page to which a real page in the real storage region 2 132 has been solely allocated has a predetermined key value, and the virtual page having the predetermined key value is selected for allocation, so that security protection is executable for such a virtual page in a manner substantially identical to the prior art.

Next, the free area generation processing 6 started at the aforementioned step 521 will be described with reference to FIG. 9. This processing is started when no free area is found in the real storage region 1 131, as explained with reference to FIG. 6. When this processing is started, it is determined at steps 900, 911 and 928A whether or not the real storage region 2 132 comprises a free area, prior to the processing for examining the real storage region 1 131. If there is no free area in the real storage region 2 132, free areas in the storage region 2 are generated at steps 928A-921A. Prior to a detailed description of this processing, the processing for generating a free area in the real storage region 1 131 will be first described. This processing is substantially identical to an LRU (least recent used) method described in the previously cited JP-A-1-180323, so that a mere concept thereof will be described below. One of real storage allocated region management tables provided for each virtual storage space of each program under execution is selected, and a virtual page allocated to a real page on a queue connected to a management table pointer C 810 is expelled from the real page for generating a free area in the real storage region 1 131. According the the LRU method, the page frame tables C on the queue are sorted in the order of lower frequncy in using corresponding real pages at constant time intervals by a page measurement processing unit (not shown) which is another component of the OS. Therefore, if the page frame tables C are orderly expelled from the head thereof, the LRU method is established. This processing is carried out in the following manner.

First, at step 920, a pointer to the first page frame table C1 in the queue is set to a key pointer variable QP for tracing the queue. Next, step 921 is provided for determining the end of the queue. When the condition for such determination is not presently satisfied, step 922 is immediately executed. In the step 922, the address of a real page corresponding to a page frame table Ci indicated by the queue pointer variable QP is designated to the operand, and an instruction called "RRBE" is issued which is one of key storage operation instructions. As will be later described with reference to FIG. 1, upon executing the RRBE instruction, a reference bit R and a change bit C in the entry of the first key storage 120 (see FIG. 1) corresponding to an associated real page are read, and ON/OFF states of both of the bits R and C are output as condition codes. At step 923, only the change bit C is examined. The change bit C set to ON indicates that information in the associated real page, after being transferred from an auxiliary storage unit (not shown) to the real storage unit 130 (FIG. 1), has been rewritten. It is therefore necessary to page out the rewritten information in the real page to the auxiliary storage unit (not shown). After the page-out of this real page has been carried out at step 924, the control is transferred to step 925. On the other hand, if the change bit C is OFF, the contents of this real page need not be paged out to the auxiliary storage unit (not shown), whereby the control is transferred to step 925 without executing step 924. In a subsequent processing, the queue pointer QP is advanced so as to indicate a following page frame table at step 925, the page frame table Ci which has been processed is moved to the end of the group of the free area management tables A at step 926, and a corresponding entry in a corresponding address translation table (not shown) is made invalid at step 927. The real page is thus made free. The processing from step 922 to step 926 is repeated until the whole queue has been processed, that is, the condition at step 921 is satisfied, a predetermined number of real pages are made free, and, the condition at step 928 is satisfied. When the processing is terminated on the basis of the determination at step 921, the processing hitherto described with reference to FIG. 9 is repeated for a queue connected to the management table pointer C 810 corresponding to another program being executed until a predetermined number of free areas are generated.

Next, reference is made to processing for generating free areas in the real storage region 2 132. This region has only a single key storage entry for the whole real storage region in order to reduce the number of provided key storage entries, thus it is not possible to determine the frequency of use of each of the real pages which constitutes a prior condition for the LRU method. Therefore, the above-mentioned method cannot be adapted to the present case, therefore a well-known FIFO (first in first out) method is applied to this embodiment. A queue of page frame tables connected to a table pointer D shown in the foregoing FIG. 8 is obtained by repeating the real storage allocation processing shown in FIG. 6. Therefore, the page frame tables D on the queue are aligned in the order of allocating respective real pages to virtual pages, that is, in the order of existing time of the tables D in the real storage region 2 132. The FIFO method sequentially reads the tables D belonging to this queue from the beginning and expels information regarding real pages corresponding to the respectively read page frame tables D. Although the second key storage unit 610 (FIG. 1) corresponding to the real storage region 2 does not have the change bit C for each of the real pages in the region 2, it is possible to detect whether or not the contents of each real page, after having been previously transferred from the auxiliary storage (not shown) to the real storage unit 130 (FIG. 1), were updated. Therefore, real pages corresponding to page frame tables B1, B2, . . . , connected to the pointer B 700 shown in FIG. 7 are paged out to the auxiliary storage (not shown) irrespective of whether the update has been carried out or not. Specifically, this processing is similar to the aforementioned processing for generating free areas in the real storage region 1 131 (steps 920–928) without the processing for the first key storage unit 120 (FIG. 1) (steps 922–924), that is, the processing executed at steps 921 and 925–927. In other words, steps 921A, 922A, and 925A–928A differ from the steps 921 922 and 925–928 merely in regards to employed page frame tables and so on. Specifically, page frame tables D connected to the table pointer D are paged out sequentially from the beginning thereof (step 922A), the pointer D shown in FIG. 8 is updated each time the page-out is executed (step 925A), each paged-out table is moved to the end of the page frame tables B connected to the table pointer B shown in FIG. 7 (step 926A), and the address translation table entry is made invalid (step 927A). The reservation of free areas in the real storage region 2 is also repeated until a predetermined number of real pages is ensured, that is, the condition at step 928A is satisfied.

Next, the hardware operation of this embodiment will be described with reference to FIG. 1. In FIG. 1, parts indicated by thick lines constitute particularly significant parts for characterizing the embodiment.

As has been previously mentioned, the first key storage unit 120 is provided for the region 1 131 which is a part of the real storage unit 130, and is composed of a plurality of entries, each entry corresponding to each of real storage management units (4-KB regions divided in the same size as the size of a virtual page, and hereinbelow called the "real page"). The contents of the entry are similar to conventional entry (123 in FIG. 1). The second key storage unit 610 is provided for the region 2 132 which occupies another part of the real storage unit 130 and comprises a single entry for a plurality of real pages belonging to the region 2 132. It should be noted that the second key storage unit 610 is set to "8" as a particular key.

An instruction register 20 holds an instruction fetched from the real storage unit 130, a DAT mechanism 70 generates a real address by using several registers 22, 23 in a general register group 30 designated by this instruction, and a real address register 100 holds the thus generated real address. The processing performed by the DAT mechanism 70 will be specifically described, also for purpose of explaining key storage operation instructions ( SSKE and ISKE ) and main storage operation instructions (a store instruction and a load instruction) which will be used in later descriptions. First, the key storage operation instruction will be described.

FIG. 10 shows an instruction format in the instruction register 20 when a key storage operation instruction is being executed. The above-mentioned SSKE (Set Storage Key Extended) and ISKE (Insert Storage Key Extended) instructions, though having different instruction codes from each other, are in the same format. The SSKE instruction is a key storage write instruction for setting key information previously set in a general register designated by a field R1 to a key storage location corresponding to a real page designated by a real address in a general register designated by a field R2. The ISKE instruction, on the contrary, is an instruction for reading key information from a key storage location corresponding to a real page indicated by a general register designated by the field R2 and inserting the read key information into a general register designated by the field R1. With these instructions, the general register designated by the field R2 in the instruction register 20 is loaded with a real address, the contents of which are set directly in the real address register 100 as they are without the DAT mechanism 70. In this embodiment, the operation of the hardware is controlled according to whether the operation executed by a key storage operation instruction is a write or a read and whether the location accessed thereby is in the first key storage unit 120 or in the second key storage unit 610, as will be later described in detail.

Next, the main storage operation instruction will be described.

FIG. 11 shows an instruction format in the instruction register 20 when a main storage operation instruction is being executed. A store instruction and a load instruction have the same structure, where the contents of a general register designated by a field X2, the contents of a general register designated by a field B2, and the contents of a field D2 are translated to a real address by the DAT mechanism 70 and held in the real address register 100. An instruction for writing the contents of the general register designated by the field R1 into a real storage region indicated by this real address is the above-mentioned store instruction, while that for reading information from the real storage region indicated by the real address and setting the same in the general register is the load instruction. The access to the real storage may or may not be permitted in accordance with key storage protection rules, as will be later described.

The present invention does not depend on the above-mentioned exemplary instructions which have been given as basic instructions for reading from and writing into the main storage for the sake of explaining the embodiment. Besides these instructions, the RRBE (Reset Reference Bit Extended) instruction, a kind of the key storage operation instructions previously referred to at step 923 shown in FIG. 9, has the same instruction format as the key storage operation instruction given as an example. However, its operation comprises reading key information 123 from a key storage location corresponding to a real page indicated by a general register designated by the field R2, examining the reference bit R and the change bit C in this key information 123 by a condition generation circuit (not shown), outputting the results to a condition code hold register (not shown) (the operations up to this point correspond to a key storage read operation performed by the ISKE instruction), and rewriting the reference bit R on the key information 123 to "0" (this operation corresponds to a key storage write operation performed by the SSKE instruction). It can be therefore seen that a key storage read operation and a key storage write operation are performed in the course of executing RRBE instruction. With such an instruction, a control circuit (not shown) may be provided for operating a key storage read control circuit 420 and a key storage write control circuit 410 in combination, as will be later referred to, so as to sequentially perform these operations according to an instruction execution sequence. The execution of the SSKE, ISKE, store and load instructions, given as examples, will hereinbelow be described as basic instructions for reading from and writing into the key storage or the main storage. A main portion of a storage protection control circuit 300, constituting a characterizing part of the embodiment, is illustrated in FIG. 1, and in detail thereof in FIG. 2. The storage protection control circuit 300 comprises a boundary address register 110 for indicating a boundary address between the region 1 131 and the region 2 132 and for holding the start real address of the region 2 132, a region determination circuit 310 for determining which of the real storage regions a real address to be accessed belongs to, a decoder circuit 40 for decoding the kind of the instruction, a key storage write control circuit 410, a key storage read control circuit 420, a key value selection circuit 430, a real storage read control circuit 440, a real storage write control circuit 450, and a key value comparison circuit 340 for comparing a key value K 11 (hereinbelow called the "access key") possessed by a program on the PSW 10 with a key value (hereinbelow called the "storage key") read from the first key storage unit 120 or the second key storage unit 610 to employ the comparison results for a storage protection check when a real storage is to be accessed, and an OR circuit 460.

Prior to explanation of the operation of the control circuit 300, the structure of a conventional key storage protection will be briefly referred to. As described in a manual "IBM Enterprise System Architecture/370 Principles of Operation; SA22-7200-0" by IBM, pages 3-7, it is a basic principle that, upon accessing data, an access key on the PSW is compared to a storage key recorded on a key storage unit corresponding to a real page in which the data exists, and access is permitted if both keys coincide with each other, whereas the access is not permitted if they do not coincide. This is called "storage protection". It should be noted that a conventional key storage entry is similar to an entry 121 of the first key storage unit 120, which entry is provided with a control information, called an "F bit" (fetch bit), used only for data reference. When the F bit is "1", the accessibility is examined by comparing the aforementioned two keys. Otherwise, data reference on the real page is permitted from programs having any key values without checking the accessibility by the key comparison.

Also in the storage protection control circuit 300 of this embodiment, when data in the real storage unit 130 is to be accessed, a key storage protection identical to the conventional one is carried out if a real page in which the data exists belongs to the region 1 131.

Further, when the real page in which the data exists belongs to the region 2 132, the key storage protection is carried out in the following manner:

(1) Instruction for writing data into a real storage

The key storage protection is performed by comparing the access key with the storage key, similar to the conventional key storage protection. However, the storage key to be compared is read from the second key storage unit 610 irrespective of whether or not the access is for updating data in a real page belonging to any location in the real storage.

(2) Data reference (read from a real storage)

Similar to the case where the conventional F bit is "0", a data reference is permitted from a program having any key value. The present invention does upon depend on whether or not the data reference should be permitted in a manner similar to the case where the F bit is "0".

When information in the key storage unit is to be directly accessed (for example, an instruction for designating an address in the real storage and for rewriting a key storage entry corresponding to the designated address, e.g., the SSKE (Set Storage Key Extended) instruction, or an instruction for reading this key storage entry, e.g., the ISKE (Insert Storage Key Extended) instruction), updating data as well as data referencing are permitted as before if the address belongs to the region 1 131. On the contrary, when the address belongs to the region 2, the following operations are performed.

(3) Instruction for writing into a key storage unit

The execution of this instruction is prohibited, and an interruption signal indicative of a program error is generated. This is because the key in the second key storage unit 610 is set to a fixed value.

(4) Instruction for reading from a key storage unit

A storage protection key is read from the second key storage unit 610 irrespective of the address value.

Figure 2:
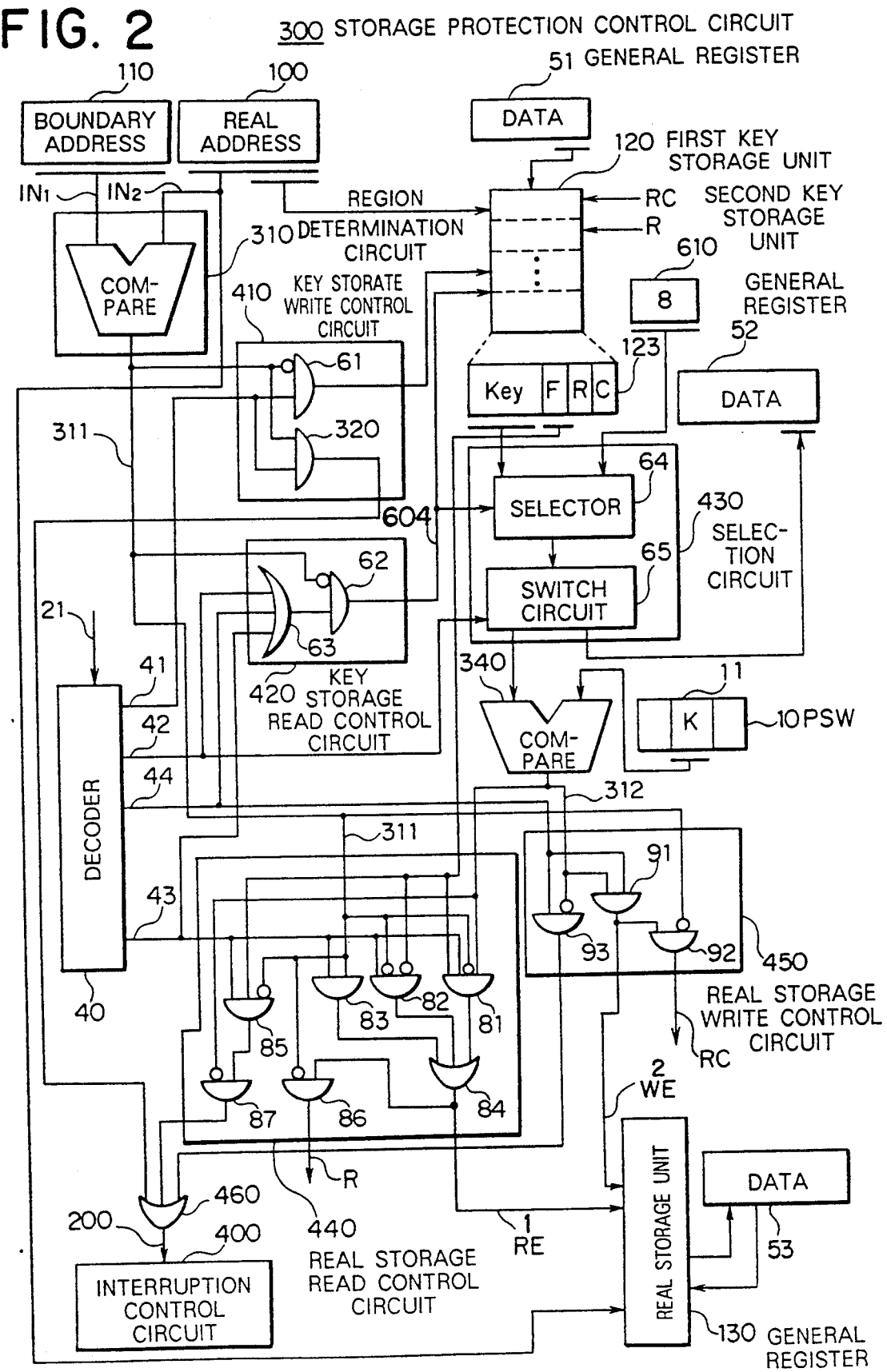
FIG. 2 is a circuit block diagram showing a storage protection control circuit.

Next, the above-mentioned control will be specifically described with reference to FIG. 2. In FIG. 2, constituents corresponding to those in FIG. 1 are designated the same reference numerals.

First, the region determination circuit 310 compares a real address IN2 designated by an instruction indicated by the real address register and a boundary address IN1 stored in the boundary address register 110 indicative of the start address of the real storage region 2 132, and determines which of the regions 1 and 2 the real address belongs to. As shown in FIG. 4, an output signal 311 of the circuit 310 is "1" when the real address belongs to the real storage region 2 132 and "0" when it belongs to the real storage region 1 131. The real address is also supplied to the first key storage unit 120. When the decoder circuit 40 determines that the instruction to be executed is an instruction for access to a key storage which requires a write into the key storage, a decode signal 41 becomes "1", as shown in FIG. 3. The key storage write control circuit 410 ANDs the signal 311 and the signal 41 by an AND gate 320 disposed therein. When the instruction to be executed is an instruction for writing into the second storage unit 610, the AND result becomes "1" which is supplied to the interruption control circuit 400 through an OR 460 as an interruption signal 200, whereby the execution of the instruction is interrupted by the interruption control circuit 400. On the other hand, when this instruction is an instruction for access to a key storage which does not need a write into the first key storage unit 123, the result or output from the AND 320 becomes "0", whereby the execution of the instruction is not interrupted. Meanwhile, the inverted comparison result 311 and the signal 41 are ANDed by an AND gate 61 which outputs "1" to the first key storage unit 123 as a write signal. Information stored in a register 51 in the general register group 30 designated by the instruction is written into an entry corresponding to a real address of the first key storage unit 123 stored in the real address register 100, thereby completing the execution of the instruction.

Next, the key storage read control circuit 420 will be described. As shown in FIG. 3, when an associated instruction is an instruction for access to a key storage which needs a read from the key storage, a signal 42 generated by the decoder circuit 40 becomes "1". In the key storage read control circuit 420, this decode signal 42, after passing an OR gate 63, is ANDed with an inverted output signal 311 from the region determination circuit 310. If a real address designated by this instruction belongs to the region 1 of the real storage unit 130, the output 311 of the region determination circuit 310 becomes "0", which results in an output 604 of the AND gate 62 becoming "1". The first key storage unit 120, in response to this output 604 at "1", reads the contents 123 of an entry corresponding to the real address stored in the real address register 100. A selector 64, in response to the output signal 604 at "1", selects the key information 123 read from the first key storage unit 120. On the other hand, when the real address designated by the instruction belongs to the region 2 of the real storage unit 130, the output 311 of the region determination circuit 310 becomes "1", whereby the selector 64, in response to the output 311 at "1", selects key information in the second key storage unit 610 and inputs the same to a switching circuit 65. The switching circuit 65 switches the destination of key information selected by the selector 64 in response to the value of the decode signal 42. In the presently supposed situation, when an instruction under execution is an instruction for access to a key storage which needs a read from the key storage, the decode signal 42 is "1", wherein the read key information is set in a register included in the general register group 30 (FIG. 1) designated by the instruction, thereby completing the execution of the instruction.

Now, description of the operation of instructions for directly accessing information in the key storage unit having been completed, the operation of instruction for access to the main storage (instructions for accessing data stored in the real storage unit) such as the store instruction (for changing data in the main storage) and the load instruction (for referencing data in the main storage) will be described.

When an instruction to be executed is one for accessing the main storage for updating information stored therein, the real storage write control circuit 450 is supplied with the signal 44 at "1" generated from the decoder circuit 40, as shown in FIG. 3. Also for executing this instruction, it is necessary to read a key value from the key storage unit for the storage protection, as mentioned above. For this reason, the decode signal 44 is supplied to an OR gate 63 arranged in the aforementioned key storage read control circuit 420, and key information from either one of the key storage units is output from the selector 64, similar to a key information read executed by the instruction for accessing a key storage. Next, in the switching circuit 65, since the signal 42 is "0", the read key value is output to the comparator 340 to be compared with the access key K 11 on the PSW 10, in a manner different than the instruction for accessing a key storage. A comparison result 312 presents "1" when both keys coincide with each other and "0" when they are different, as shown in FIG. 5. This signal 312 is delivered to the real storage write control circuit 450 to be used for controlling the accessibility. More specifically, the inverted signal 312 and the signal 44 are ANDed by an AND gate 93. When the AND gate 93 outputs a resultant signal at "1" indicating a discrepency between the two keys, this output signal from the AND gate 93 is supplied through an OR gate 460 to the interruption control circuit 400 as an invalid access to interrupt the execution of the instruction.

Further, the decode signal 44 and the comparison signal 312 are ANDed by an AND gate 91. When both of the key values coincide with each other, the signal 312 is "1", whereby an output 2 from the AND gate 91 is supplied to the real storage unit 130 as a write enable signal WE. Then, data in a register 53 in the general register group 30 designated by the instruction is written into a real storage location indicated by a real address stored in the real address register 100. Further, the write enable signal WE or the output 2 and the inverted comparison signal 311 are ANDed by an AND gate 92. When this real address belongs to the real storage region 1 133, an output signal RC from the AND gate 92 becomes "1". This signal RC is delivered to a circuit (not shown) for setting the reference bit R and the change bit C in the key storage entry corresponding to the real storage location, and the execution of the instruction is thus completed.

Next, explanation will be given of the operation for executing an instruction for reading data from the main storage. When this type of instruction is to be executed, the signal 43 is set to "1" by the decoder circuit 40 as shown in FIG. 3. Also for this instruction, the decode signal 43 is input to the OR gate 63 arranged in the key storage read control circuit 420, key information is read from the first key storage unit 120 or the second key storage unit 610, and this key information is compared to a key in the PSW 10 by the comparator 340, for storage protection similar to that carried out for the aforementioned real storage write instruction. The real storage read control circuit 440 is supplied with the comparison signal 312, the signal 311 indicating which of the real storage regions is accessed, the decode signal 43, and the F bit (a storage protection control bit used only for data reference which has been referred to in the explanation of the key storage protection) in the key storage entry when key information is read from an entry in the first key storage unit 120. Reference to the main storage is permitted if any of the following three conditions is satisfied:

(1) An instruction for referencing data in the real storage region 1 is to be executed, the F bit is "1", and the two keys are coincident.

An AND gate 81 is supplied with the inverted output 311 from the region determination circuit 310, the comparison signal 312 and the decode signal 43 and delivers an output at "1" through an OR gate 84 to the real storage unit 130 as a read signal RE. Data at a real storage location in the real storage unit 130 designated by a real address stored in the register 100 is read to a register 53 in the general register group 30 designated by the instruction.

(2) An instruction for reading data stored in the real storage region 1 is to be executed, and the F bit is "0".

Data referencing is permitted if storage protection is carried out by comparing the two key values. The read signal RE is generated by an AND gate 82 which is supplied with the decode signal 43, the inverted region determination signal 311, and the inverted F bit in key information read from the first key storage unit 120. An instruction for reading data in the real storage region 2 is to be executed.

Data referencing is permitted without performing the storage protection by comparison of the two key values.

In the above cases, by further ANDing the signal RE, or 1, and the inverted signal 311 by an AND gate 86, a signal R is generated for accessing the real storage region 1 133 and delivered to a circuit (not shown) for setting the reference bit R in a key storage entry corresponding to an associated real storage location. The execution of the instruction is completed when this setting of the reference bit R has been carried out.

When an instruction for reading data from the real storage region 1 133 is concerned, where the F bit is "1" (when the storage protection is performed by comparing the key values even for data reference) and the two key values are not coincident, the execution of this instruction is interrupted. Specifically, the output of an AND gate 85 supplied with the decode signal 43, the region determination signal 311, the comparison signal 312 and the F bit becomes "1". If the output from the AND gate 85 and the inverted comparison signal 311 (indicating a discrepancy of the two key values) are ANDed by an AND gate 87 which outputs a signal at "1", this output signal from the AND gate 85 is supplied through an OR gate 460 to the interruption control circuit 400 as an invalid access, as indicated by a discrepancy of the two key values, whereby the execution of the instruction is interrupted.

As described above, the storage protection control is carried out in accordance with the kinds of instructions and regions accessed for executing instructions, thereby ensuring the key storage protection for the real storage region 1 131 as before as well as preventing erroneous accesses to the key storage unit for the real storage region 2 132. Further, a key storage protection similar to conventional one can be carried out except that a particular key value is set. Therefore, by expanding the real storage region 2 132, a huge real storage can be realized without incurring problems due to an increase of the key storage capacity as described in connection with the prior art.

It should be understood that the present invention is not limited to the above described embodiment and also covers various modifications.

What is claimed is:

1. A data processing apparatus comprising:
   a real storage having first and second regions each having a plurality of real unit regions; and
   a plurality of storage locations, each storage location being provided for a corresponding one of said real unit regions of said first region, each of said plurality of storage locations having a first field for storing a storage protection key determined by a protection key assigned to a virtual unit region after a real unit region has been allocated to said virtual unit region and a second field for storing at least one information signal related to accessing said corresponding real unit region executed after said corresponding real unit region has been allocated to said virtual unit region,
   one storage location provided in common to said plurality of real unit regions of said second region having a field for storing a storage protection key predetermined for common use among said real unit regions of said second region, said one storage location storing said predetermined storage protection key before one of said real unit regions of said second region is allocated to a virtual unit region; and
   accessing means responsive to an instruction designating one real unit region of said real storage for either of access to data held in said designated real unit region or access to a storage protection key for said one designated real unit region for accessing one of said plurality of storage locations corresponding to one of said real unit regions of said first region when the designated real unit region is one of said real unit regions of said first region, and for accessing said one storage location when the designated real unit region one of said real unit regions of said second region.

2. A data processing apparatus according to claim 1, wherein said predetermined storage protection key is a key value which can be commonly allocated to a plurality of user programs.

3. A data processing apparatus according to claim 1, wherein said plurality of storage locations belong to a key storage unit; and
   wherein said accessing means comprises:
   determining means for determining whether said real unit region designated by said instruction belongs to said first region or said second region; and
   storage location access means for accessing a storage location corresponding to said designated real unit region in said key storage unit when it is determined that said real unit region designated by said instruction belongs to said first region of said real storage, and for accessing said one storage location when it is determined that said real unit region designated by said instruction belongs to said second region of said real storage.

4. A data processing apparatus according to claim 1,
wherein said instruction is a real storage access instruction which requires access both to data held in said real unit region designated by said instruction and a storage protection key for the real unit region designated by said instruction,
wherein said accessing means comprises reading means for reading a storage protection key from one of said storage locations corresponding to the real unit region designated by said instruction when said real unit region designated by said instruction belongs to said first region of said real storage, and for reading the predetermined storage protection key from said one storage location, when said real unit region designated by said instruction belongs to said second region, and
wherein said data processing apparatus further comprises access determining means for determining whether or not access to said real unit region designated by said instruction is permitted by said storage protection key read by said reading means.

5. A data processing apparatus according to claim 4, wherein said access determining means comprises means for determining whether or not access to said real unit region designated by said instruction is permitted on the basis of whether or not said read storage protection key and an access key allocated to said program satisfy a predetermined relationship.

6. A data processing apparatus according to claim 1,
wherein said instruction is a storage key access instruction which requires access to a storage protection key for the real unit region designated by said instruction for either reading or updating said storage protection key; and
wherein said accessing means comprises:
means for accessing one of said storage locations corresponding to said real unit region designated by said instruction when said real unit region designated by said instruction belongs to said first region of said real storage, irrespective of whether said instruction requires reading of a storage protection key stored for the real unit region designated by said instruction or for updating said storage protection key,
means for accessing said one storage location when said real unit region designated by said instruction belongs to said second region of said real storage and said instruction requires reading a storage protection key for said real unit region designated by said instruction, and
means for prohibiting access to said one storage location when said designated real unit region belongs to said second region and said instruction requires updating of a storage protection key for said real unit region designated by said instruction.

7. A data processing apparatus comprising:
a real storage having first and second regions each having a plurality of real unit regions;
a plurality of storage locations, each storage location being provided for a corresponding one of said real unit regions of said first region, and receiving a storage protection key determined by a protection key assigned to a virtual unit region after a real unit region corresponding to each of said storage locations of said first region has been allocated to said virtual unit region,
a single storage location provided in correspondence to said real unit regions of said second region for receiving a single storage protection key predetermined for said real unit regions of said second region prior to allocation of a real unit region of said second region to a virtual unit region; and
determining means for determining whether access requested by a presently executed program to a specific one of said real unit regions of said first region is permissible based upon a storage protection key held in one of said plurality of storage locations corresponding to said specific real unit region of said first region, and for determining whether access requested by a presently executed program to one of said real unit regions of said second region is permissible based upon said predetermined single storage protection key.

8. A data processing apparatus according to claim 7, wherein said predetermined single storage protection key is a key storage protection which can be allocated commonly to a plurality of user programs.

9. A data processing apparatus according to claim 7, wherein said plurality of storage locations belong to a key storage means comprises:
a first key storage unit including said single storage location including said plurality of storage locations; and
a second key storage unit for holding said predetermined single storage protection key unit; and
wherein said determining means comprises:
means for determining to which of said first region and said second region a real unit region requested by a presently executed program to be accessed belongs;
reading means for reading a storage protection key stored in one of said storage locations corresponding to said unit region requested to be accessed in said key storage unit, when said real unit region requested to be accessed belongs to said first region, and for reading said predetermined storage protection key stored in said single storage location, when said real unit region requested to be accessed belongs to said second region; and
access determining means for determining whether or not the storage protection key read by said reading means and an access key allocated to said presently executed program which has requested access to the real unit region satisfy a predetermined relationship, and for determining whether or not the access is permitted in accordance with said relationship determination.

10. A data processing apparatus according to claim 9, wherein said predetermined relationship being satisfied when said read storage protection key equals said access key allocated to said presently executed program.

11. A data processing apparatus according to claim 9, wherein said access determining means includes means for permitting said access to said real unit region to be accessed without said relationship determination when said access to said real unit region has been requested for reading data from said real unit region and said real unit region to be accessed belongs to said second region.

12. In a data processing apparatus comprising a real storage having first and second regions each including a plurality of real unit regions, a plurality of storage locations, each storage location being provided for a corresponding one of said real unit regions of said first region, and a single storage location provided commonly for said real unit regions of said second region, a memory allocating method comprising the steps of:

(a) storing a predetermined storage protection key for said second region in said single storage location before allocating any of said real unit regions of said second region to a virtual unit region;

(b) determining whether or not a value of a storage protection key requested by a presently executed program for a virtual unit region is equal to said predetermined storage protection key in response to said presently executed program requesting allocation of a real unit region either of said first and second regions to said virtual unit region;

(c) allocating one of said real unit regions within said first region to said virtual unit region when a result of the determining step is negative;

(d) writing said storage protection key requested by the program for said virtual unit region into one of the plurality of storage locations corresponding to said allocated real unit region; and (e) allocating one of said real unit regions within said second region to said virtual real unit region when said result of the determining step is affirmative.

13. A method according to claim 12, wherein said predetermined storage protection key is a common storage protection key which is to be allocated to a plurality of user programs.

14. A method according to claim 12, wherein said method further comprises the steps of:

(1e) searching an unallocated real unit region within said second region before execution of step (e) when the result of said determining step is affirmative;

(2e) executing said allocating step (e) when an unallocated real unit region within said second region has been found, so that said found unallocated real unit region is allocated to said virtual unit region; and (f) allocating an unallocated real unit region of said first region to said virtual unit region when no unallocated real unit region is found within said second region in said step (1e), and writing said storage protection key requested by the program into one of said plurality of storage locations corresponding to said unallocated real unit region of said first region.

15. A method according to claim 14 further comprising the step of:

(g) releasing a predetermined number of real unit regions in each of said first and second regions when no unallocated real unit region is found in said first region at the step (f).

16. A method according to claim 15 further comprising the step of:

(h) allocating an unallocated real unit region in said first region to said virtual unit region after a predetermined number of real unit regions in said first region have been released by step (g).

17. A method according to claim 12 further comprising the steps of:

determining whether or not one already allocated real unit region belonging to said first region and having been already allocated to one virtual unit region has been updated after contents of said one already allocated real unit region belonging to said first region have been transferred from a secondary storage unit to said real storage, based on update information stored in one of said storage locations corresponding to said one already allocated real unit region of said first region when said one already allocated real unit region of said first region is to be released from said virtual unit region;

controlling whether or not the contents of said one already allocated real unit region of said first region are to be transferred to said second storage unit on the basis of the determination of said step of updating said already allocated real unit region; and transferring contents of another real unit belonging to said second region and having been already allocated to another virtual unit region to said second storage unit, irrespective of whether or not contents of said another already allocated real unit region have been updated after contents of said another already allocated real unit region allocated to a virtual unit region has been transferred from said secondary storage unit to said real storage, when said another already allocated real unit region of said second region is to be released from the another virtual unit region.

18. A method according to claim 12 further comprising the steps of:

selecting a least frequently referenced one of a plurality of real unit regions belonging to said first region which have been allocated to virtual unit regions, when one of said real unit regions belonging to said first region is to be released releasing the least frequently referenced real unit region;

selecting earliest allocated one of a plurality of real unit regions belonging to said second region which have been allocated to virtual unit regions, when one of said real unit regions belonging to said second region is to be released; and releasing the earliest allocated real unit region selected.

* * * * *